3,020,195
PRODUCTION OF POTASSIUM COMPOUNDS
Ferri Casciani, York, and Harry D. Bauman, Glen Rock, Pa., assignors to P. H. Glatfelter Company, Spring Grove, Pa., a corporation of Pennsylvania
Filed Feb. 29, 1960, Ser. No. 11,637
16 Claims. (Cl. 162—32)

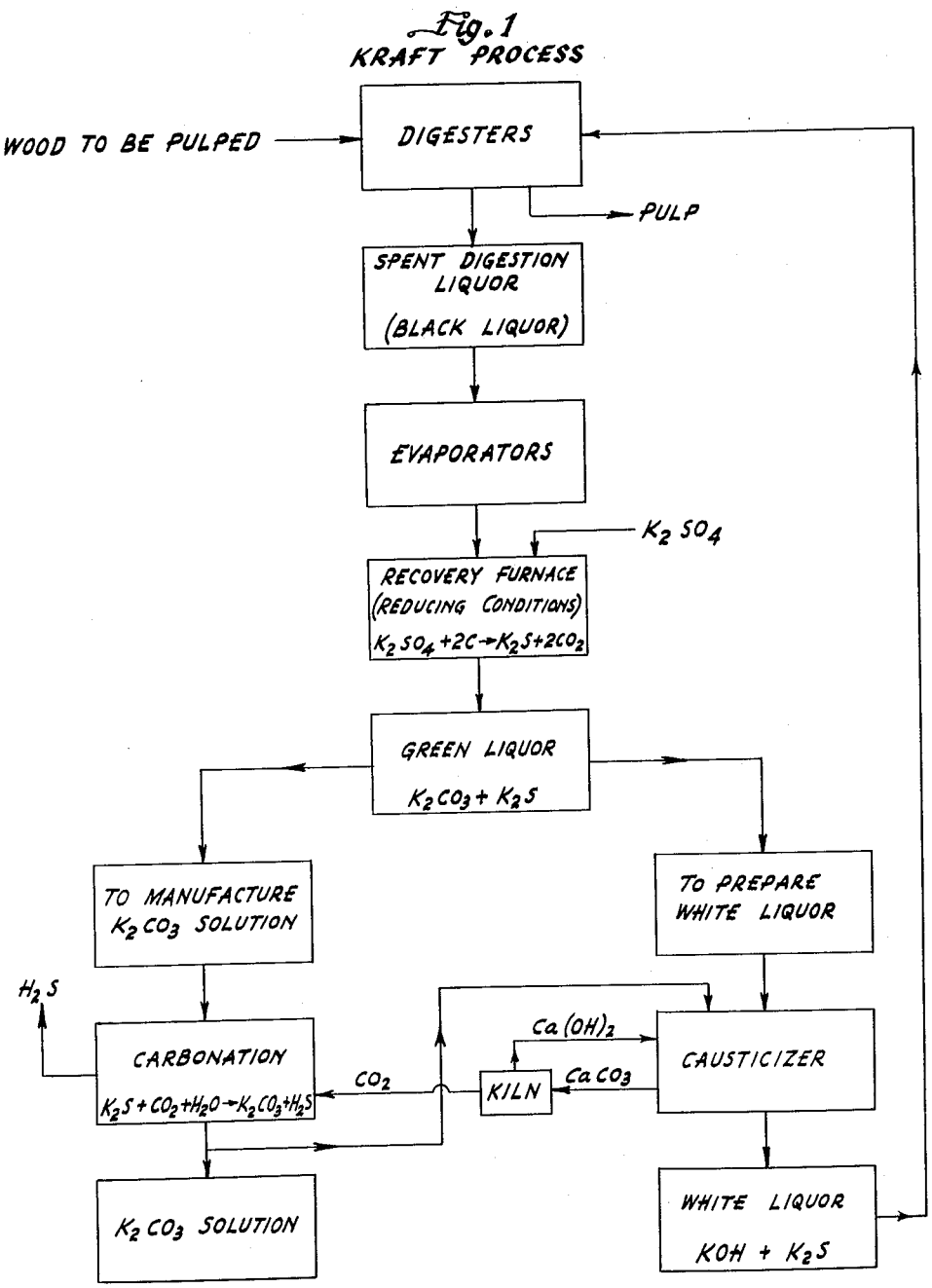

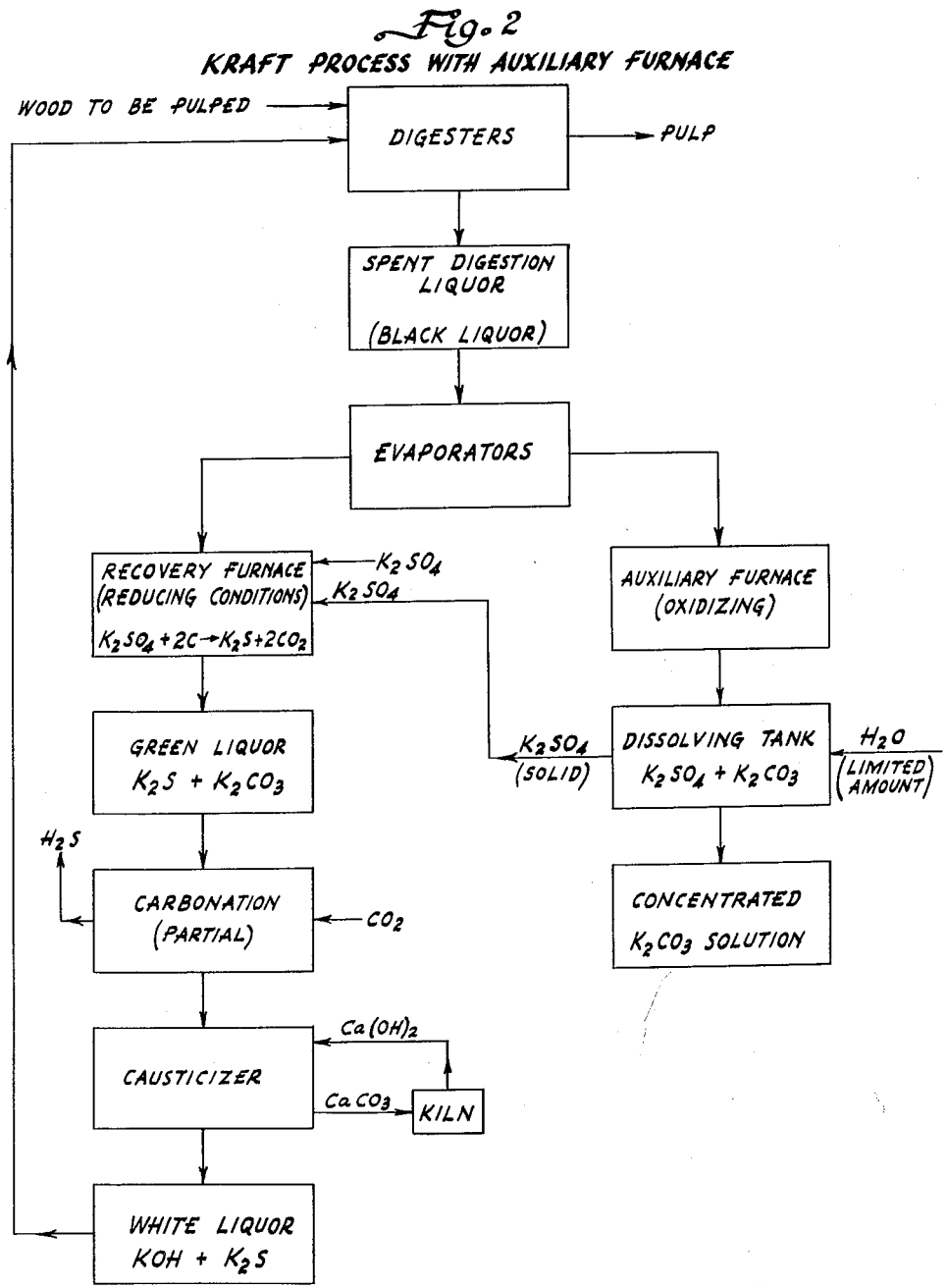

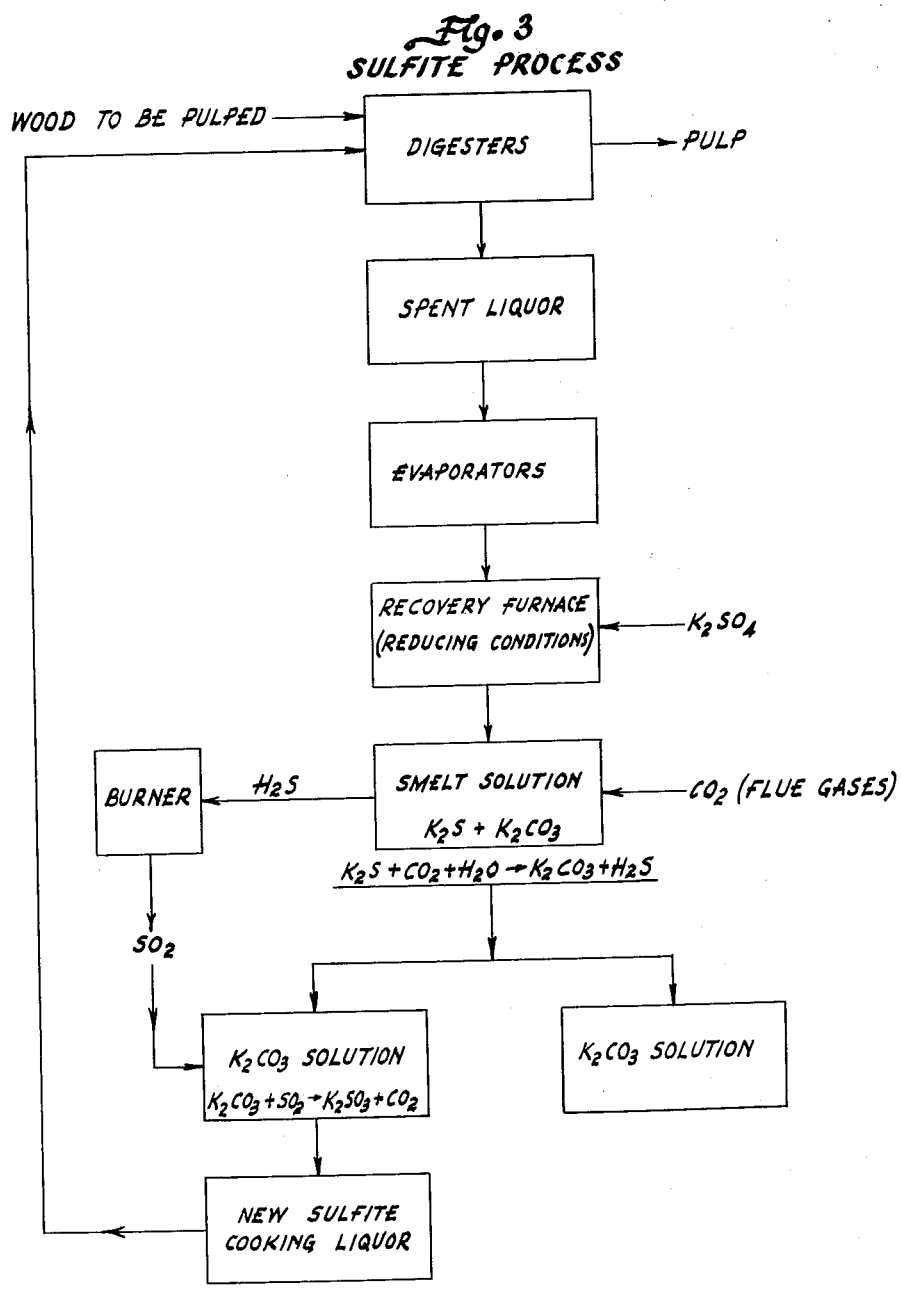

This invention relates to the production of wood pulp and the chemicals used therein and, more particularly, to the pulping of wood in a potassium base pulping liquor and the production of potassium compounds in large quantities from the potassium base spent pulping liquors.

In accordance with this invention the spent cooking liquors are used efficiently and economically for the production of valuable by-products in the conventional pulping and recovery equipment used throughout the industry. This process provides a simple and practical method for the manufacture of valuable potassium compounds utilizing such pulping systems in conjunction with the recovery and purification of chemicals used in pulping processes, furnishing thereby great economic advantage to the pulping industry.

The process of this invention provides a simple and practical method of manufacturing valuable potassium compounds from relatively cheap compounds such as potassium sulfate or potassium chloride. In particular, large quantities of relatively expensive potassium carbonate, potassium bicarbonate, and potassium hydroxide can be prepared cheaply by the process of this invention which utilizes conventional pulping and recovery systems.

Potassium carbonate has long been one of the most difficult and relatively expensive of the common alkalis to manufacture. The compound is useful in a number of fields such as the production of Bohemian glass, difficultly fusible glasses, glass for television tubes; electroplating; the production of soft soaps; ceramic products, etc., providing products unexcelled by similar or related compounds. Further, potassium carbonate and other compounds of potassium are in demand in the chemical industries because they crystallize well.

One of the methods which has been used for manufacturing potassium carbonate is the Engel-Precht process, in which process potassium chloride, magnesium carbonate, water and carbon dioxide are reacted under pressure. The hydrated double salt of magnesium and potassium formed in the reaction is separated from the solution of magnesium chloride and decomposed by heat. This method is complicated, costly and results in low yields of the desired salt. Most potassium carbonate presently is produced electrolytically from potassium chloride. This process first produces potassium hydroxide which must then be converted to potassium carbonate. The principles and techniques of the ammonia-soda process, or Solvay process, used in the manufacture of sodium carbonate and bicarbonate are not applicable for the production of potassium carbonate and bicarbonate.

The present invention provides an economical system of manufacturing valuable potassium compounds that may be adapted for use in conjunction with any pulping process normally employing a digestion liquor containing either sodium sulfide, sodium sulfite, sodium bisulfite, sodium hydroxide, or any combinations thereof, or normally employing sulfites or bisulfites of cations other than sodium. These processes include the so-called kraft or sulfate process, conventional sulfite process, neutral sulfite process, alkaline sulfite process and the soda process.

This invention contemplates the digestion of ligneous cellulosic materials with a potassium base pulping liquor also for the reason that there are benefits derived from a potassium base cooking liquor which are unachievable when using sodium base liquors. For example, the yield and quality of pulp are improved by digestion with a potassium base liquor, and the potassium compounds formed during the pulping operation are more easily extracted from the pulp than compounds presently employed.

A further advantage of the present invention is that the smelt prepared from a spent potassium base cooking liquor during the recovery operation has a lower melting point than a corresponding sodium base smelt and therefore permits lower temperatures in the recovery furnaces. The spent digestion liquors resulting from the pulping of wood using the kraft technique, and the spent digestion liquors from the sulfite process, or indeed the spent digestion liquors from any of the heretofore mentioned pulping techniques may be combined for evaporation and burned in a common recovery furnace. Such combination of spent digestion liquor effluents provides marked technical and economical advantages in those plants which utilize more than one pulping technique, and would, in fact, by greater flexibility and freedom from restrictions on ratios of combinations, encourage greater interest in such combination of pulping techniques.

Lower temperatures decrease the operation and maintenance costs of the recovery furnaces and appreciably decrease loss of valuable salts in the flue gases. In addition, not inconsequential amounts of potassium are recovered from the mineral content of the wood which is pulped.

A further advantage peculiar to the potassium base system comprising the present invention is that the great solubility of potassium carbonate makes it possible to work with smelt solutions containing high concentrations of potassium carbonate without troublesome salting-out occurring in sodium base systems.

In a conventional pulping and recovery operation, there is a normal loss of cooking chemicals which must be replaced in order to maintain an efficient operation. Without sacrifice to this efficient operation, our process provides for the manufacture of valuable potassium compounds in large quantity as by-products in the manufacture of pulp.

In accordance with the principles of the present invention, a great excess of potassium sulfate above that necessary to replace normal potassium losses is added to the spent digestion liquor. Concentration of the spent liquor followed by burning in a kraft-type recovery furnace substantially completely converts all potassium compounds present to a smelt of sulfides and carbonates. An aqueous solution then is formed from the furnace smelt. However, because of the large excess of potassium sulfate added, this smelt solution has a potassium sulfide to potassium carbonate ratio greater than desired in new kraft digestion liquor. To correct this, the smelt solution is divided into two streams and the first, which contains all the potassium sulfide required for the production of new kraft digestion liquor, is sent to the causticizing operation. The second is treated with carbon dioxide to effect substantially complete conversion of the potassium sulfide present to potassium carbonate and hydrogen sulfide gas. Enough of this solution after treatment with carbon dioxide is added to the causticizing operation to give the desired sulfidity in the new kraft digestion liquor. The remainder of this solution which has been carbonated is used in the production of potassium carbonate as a commercially valuable by-product.

Alternatively a portion of the smelt or smelt solution is recycled to the oxidation zone of the recovery furnace which is rich in carbon dioxide and wherein excess sulfides present are converted to carbonates, reducing thereby the sulfide to carbonate ratio.

In accordance with another aspect of the present invention a portion of the concentrated spent digestion liquor is burned in a separate, auxiliary furnace under strong oxidizing conditions, thus converting all potassium compounds present to a smelt composed of potassium carbonate and potassium sulfate. This smelt is dissolved in a limited quantity of water such that only sufficient water is present to dissolve the highly soluble potassium carbonate, while the potassium sulfate, which is insoluble in concentrated potassium carbonate solutions, remains as a solid residue. Alternatively the smelt may be dissolved in water and when concentrated by evaporation to about 50% potassium carbonate by weight, the potassium sulfate completely precipitates from solution. The potassium sulfate resulting from this operation is cycled to the main recovery furnace discussed hereinabove. Highly pure potassium carbonate is prepared from the solution as a by-product.

For a clearer understanding of this invention, reference is now made to the process shown in the flow sheet of FIG. 1. The process as illustrated in this flow sheet, basically, is typical of any kraft wood pulping operation but includes modifications to enable the process of the present invention to be performed. In the illustrated embodiment, wood source material such as chips are digested in a potassium base pulping liquor comprising essentially an aqueous solution of potassium hydroxide and potassium sulfide, using the conventional pulping technique. It is essential that a potassium base pulping liquor be used in the process embodying the present invention. A potassium base pulping liquor offers many advantages not derived from other alkali metal base cooking liquors and one of the principal reasons for employing the same is that, when potassium base pulping liquor is used, the loss of potassium during the cooking and recovery operations is at least partly compensated for by the potassium present in the pulp wood, this potassium being extracted from the wood in the cooking operation.

After digestion, the wood pulp is separated from the spent digestion liquor, called black liquor in the kraft process, which is concentrated by evaporation to about 50% total solids, by weight, for more efficient handling. The concentrated black liquor is burned in a recovery furnace as used in conventional kraft mills throughout the industry. Such a furnace provides both oxidizing and reducing zones.

In accordance with the process of our invention, a large amount of potassium sulfate is added to the black liquor by any convenient means in, or prior to, the recovery furnace. The potassium sulfate is added to the black liquor concentrate in quantities greatly in excess of that amount needed to replace potassium losses to maintain the normal cooking cycle. The excess amount of potassium sulfate added is determined by the quantity of potassium by-products desired. In utilizing the principles of this invention, about 90% yields of by-product potassium carbonate can be obtained when the ratio of added excess of potassium sulfate is about one mole to four moles of total potassium compounds in the smelt from the furnace, all expressed as $K_2O$. The amount of excess potassium sulfate which can be added is limited only by the organic content of the spent digestion liquor in that the fuel value of the organic content must be sufficient to sustain the reactions in the furnace. However, even this limiting amount of potassium sulfate can be exceeded if a supplementary fuel is fed to the furnace. While the organic content of spent digestion liquors varies widely, a reasonable upper limit for the excess of potassium sulfate is one mole of potassium sulfate to two moles of total potassium compounds in the smelt from the furnace, all expressed as $K_2O$.

The concentrated black liquor is burned in the recovery furnace and subjected to strong reduction in the reducing zone. The smelt produced comprises essentially a fused mixture of potassium sulfide and potassium carbonate and small quantities of unreduced potassium sulfate. Analyses respectively of a typical white liquor, concentrated black liquor and the smelt from the recovery furnace utilizing the process of the present invention are set out in Table 1.

TABLE 1

*Analysis of a typical white liquor*

| | |
|---|---|
| KOH _____grams per liter as $K_2O$__ | 100.7 |
| $K_2S$ _____do____ | 33.5 |
| $K_2CO_3$ _____do____ | 1.0 |
| $K_2SO_4$ _____do____ | 3.5 |
| $K_2SO_3$ and $K_2S_2O_3$_____do____ | 0.5 |
| Active alkali_____do____ | 134.2 |
| Sulfidity _____percent__ | 25 |

*Analysis of a typical smelt*

[Percentages by weight]

| | Percent |
|---|---|
| $K_2CO_3$ | 65.0 |
| $K_2S$ | 31.2 |
| $K_2SO_4$ | 3.3 |
| $K_2SO_3$ and $K_2S_2O_3$ | 0.3 |
| Silica and insolubles | 0.2 |

*Analysis of a typical concentrated black liquor*

[Percentages by weight]

| | Percent |
|---|---|
| Total solids | 52.6 |
| $K_2O$ | 16.9 |
| S | 1.2 |
| Organic matter | 30 |

The smelt from the recovery furnace is quenched or otherwise dissolved in water or some suitable effluent solution from the process to yield a characteristic "green liquor" solution containing essentially potassium sulfide and potassium carbonate. Reduction of potassium sulfate in amounts greater than needed to replace potassium losses results in a smelt too high in sulfidity; that is, too rich in potassium sulfide for the production of new kraft digestion liquor.

As illustrated, the sulfide-rich smelt from the smelt dissolving tank is divided into two streams. One stream of the smelt solution is passed to a causticizing operation for the preparation of new digestion liquor, commonly called "white liquor." This portion of the smelt solution contains all the potassium sulfide required to give the desired sulfidity in the new white liquor. In the causticizing vessel this portion is enriched with potassium carbonate, as described shortly hereinafter, and causticized with lime to form an alkaline digestion liquor containing potassium hydroxide and potassium sulfide. The white liquor is clarified, using conventional techniques, and pumped to storage for use as needed in the pulping operation.

The other stream of green liquor is subjected to carbonation with a carbon dioxide-containing gas. In the preferred embodiment of this invention, the green liquor solution is subjected to carbonation in plural stages, at temperatures in the 250° F. to 350° F. range, and pressures of the range 3 to 5 atmospheres, these being conditions which favor the formation of potassium carbonate. Each successive carbonation stage is followed by flash stripping of the carbonated solution.

Equipment for the carbonation process may be any conventional gas-absorption apparatus. The carbon dioxide gas may be obtained from the best available source as dictated by the economics of the process. Flue gasses and lime kiln gases manufactured in the process of this invention may be used to advantage; however, it may be advisable first to purify the flue gas by removing suspended matter and scrubbing out sulfur dioxide and other undesirable contaminants. In the preferred embodiment of the present invention, lime kiln gases are used, such gases being readily available in the kraft process. It has been found that the amount of thiosulfate formed in the carbonation process is negligible.

The principal purpose of the flash-stripping operation is to remove sulfur from the carbonate solution as volatile hydrogen sulfide and to recover as much as possible of the hydrogen sulfide in a concentrated form. This flash-stripping may be carried out in any conventional equipment known in the art which is capable of substantially removing the hydrogen sulfide with little or no evolution of carbon dioxide from the smelt solution.

A conventional method of flash-stripping comprises introducing the solution from each carbonation stage into a chamber maintained at a pressure below the vapor pressure of water at the temperature of the influent solution, whereby a flash-stripping or sudden release of water vapor occurs, accompanied by the simultaneous evolution of a portion of the hydrogen sulfide with only a small proportion of carbon dioxide. By utilizing this conventional carbonation technique, the green liquor effluent is substantially freed of sulfides as shown in Table 2. From such a carbonated green liquor, potassium carbonate free of potassium sulfide is obtained by crystallization. After carbonation, the solution of potassium carbonate is filtered by any convenient method and divided into two portions. One portion is cycled to the causticizer for the purpose of adjusting the sulfidity of the new white liquor as described hereinbefore. The other part of the carbonated solution contains the by-product potassium carbonate and is used as a solution or, if preferred, is further processed to obtain solid potassium carbonate by crystallization.

The following table gives typical analyses of the carbonated green liquor after a three stage carbonation operation utilizing lime kiln gas as the source of $CO_2$.

TABLE 2

|  | grams per liter (as $K_2O$) of— | | | |
| --- | --- | --- | --- | --- |
|  | $K_2S$ | $K_2CO_3$ | $K_2SO_4$ | $K_2SO_3$ and $K_2S_2O_3$ |
| Initial | 95.4 | 158.5 | 6.6 | 0.48 |
| 1st stage | 28.1 | 225.3 | 7.1 | 0.48 |
| 2nd stage | 5.3 | 247.8 | 7.4 | 0.50 |
| 3rd stage | 1.1 | 251.6 | 7.6 | 0.55 |

In the total application of the principles of this invention, the hydrogen sulfide evolved in the carbonation of the green liquor, as described hereinabove, also comprises a by-product of value and could be used in a variety of ways. One method is to burn the hydrogen sulfide so as to obtain sulfur dioxide which can be used to produce sulfuric acid, or in a mill employing both kraft and sulfite cooking operations, the sulfur dioxide can be used in the preparation of sulfite cooking liquor. Further, if desired, hydrogen sulfide and sulfur dioxide can be combined to obtain elemental sulfur.

It also has been discovered that the potassium sulfide-rich smelt or smelt solution may be cycled to the upper region of the recovery furnace; that is, the oxidation zone of the furnace which is rich in carbon dioxide, wherein a large part of the excess potassium sulfide will be converted to potassium carbonate. In this manner the sulfide concentration of the smelt is decreased and the carbonate concentration increased.

Another embodiment of method of operation in accordance with the invention is illustrated in the flow sheet of FIG. 2, wherein it is seen that a portion of the concentrated black liquor may be burned in an auxiliary furnace under strongly oxidizing conditions. The smelt resulting from burning the liquor concentrate in this oxidizing furnace is comprised of a molten mixture of potassium carbonate and potassium sulfate. A typical analysis of such a smelt is shown in Table 3. This smelt is quenched or dissolved in a limited amount of water so that only the highly soluble potassium carbonate is taken into solution and the potassium sulfate, which is insoluble in a concentrated potassium carbonate solution, remains as a solid residue. The potassium sulfate is separated from the potassium carbonate solution and cycled to the main recovery furnace as part of the make-up excess of potassium sulfate added to that furnace. The by-product potassium carbonate is thus obtained in a concentrated solution which may be sold as such or used to produce solid potassium carbonate by crystallization.

TABLE 3

*Typical smelt from auxiliary furnace*

[Percentages by weight]

|  | Percent |
| --- | --- |
| $K_2CO_3$ | 67.7 |
| $K_2SO_4$ | 32.1 |
| Silica and insolubles | 0.2 |

It will be appreciated that when an auxiliary furnace is used, sufficient potassium sulfate must be added to the main recovery unit to restore chemical losses and to provide the raw material for the potassium compounds manufactured in the auxiliary furnace. It will also be necessary to carry out a carbonation operation of the smelt solution from the main recovery furnace in order to adjust the sulfidity down to the range desired for the preparation of new white liquor.

The following examples will further illustrate this invention but it is to be understood that the invention is not to be restricted to these examples:

EXAMPLE 1

Experimental pulping and recovery operations show that a kraft mill producing 400 tons of pulp per day can operate on the following daily cycle of materials. Utilizing the techniques of the kraft process, 780.2 tons of pulp wood are digested in a potassium base pulping liquor comprising essentially 158 tons of potassium hydroxide and 52.6 tons of potassium sulfide. All potassium compounds are given as $K_2O$ unless otherwise indicated. 3.2 tons of potassium compounds are lost in the pulping operations, of which 1.4 tons are replaced by the potassium recovered from the pulp wood itself. The black liquor extracted from the pulp contains 208.8 tons of potassium compounds. The black liquor is evaporated and burned in a recovery furnace at temperatures of 1500° to 1700° F. 64.9 tons of potassium sulfate are added to the black liquor in the recovery furnace. Reduction of the potassium sulfate is about 90% complete. The smelt will contain essentially 165.8 tons of potassium carbonate and 99.8 tons of potassium sulfide. The smelt will be dissolved in about 200,000 gallons of water and the resulting aqueous solution divided into two streams. 46.7% of the smelt solution, containing 77.4 tons of potassium carbonate and 46.6 tons of potassium sulfide, will be pumped to a plural stage carbonation operation where it is carbonated with lime kiln gases at about 350° F. and pressures of about 3 atmospheres. The resulting solution after carbonation and stripping contains about 124 tons of potassium carbonate, which solution is divided into two portions; one portion is added to the second stream of the smelt solution in the causticizing vessel for preparation of new white liquor and the other portion, containing 52.8 tons of potassium carbonate, is used to produce by-product potassium carbonate. Thus, in a 400 ton per day pulp mill, the addition of about 600 lb. of potassium sulfate, as $K_2SO_4$, per ton of pulp, can produce daily about 77 tons of by-product potassium carbonate, as $K_2CO_3$.

EXAMPLE 2

Experimental pulping and recovery operations show that a kraft mill producing 400 tons of pulp per day and utilizing an auxiliary oxidizing furnace could operate on the following daily cycle of materials. 780.2 tons of pulp wood are digested in a potassium base pulping liquor comprising essentially 158 tons of potassium hydroxide and 52.6 tons of potassium sulfide. 3.2 tons of potassium compounds are lost in the pulping operation of which 1.4 tons are replaced by the potassium recovered from the pulp wood itself. The black liquor is extracted from the pulp, evaporated, and the concentrated black liquor is divided into two streams. 30% by weight of the concentrated black liquor, containing about 62.2 tons of potassium compounds is sent to the auxiliary furnace and burned under strongly oxidizing conditions at 1700° to 2000° F. The smelt from the auxiliary furnace, comprising 46 tons of potassium carbonate and 17.3 tons of potassium sulfate, is quenched in a limited amount of water so that only the potassium carbonate is dissolved. The 17.3 tons of potassium sulfate is cycled to the main recovery furnace where it is added to the stream comprising 70% by weight of the concentrated black liquid and containing about 145.5 tons of potassium compounds. To this stream is added an additional 56.8 tons of potassium sulfate and the whole is burned in the main recovery furnace. The smelt from the main recovery furnace, comprising essentially 116.2 tons of potassium carbonate and 96.6 tons of potassium sulfide, is dissolved in water, filtered by any convenient means, and then is carbonated only to the extent that the amount of potassium sulfide is reduced to 53.2 tons. The carbonated green liquor, now comprizing about 159.6 tons of potassium carbonate and 53.2 tons of potassium sulfide, is sent to the causticizing operation for preparation of new white liquor. The by-product potassium carbonate, about 67.5 tons as $K_2CO_3$, is contained in the concentrated solution resulting from dissolving the smelt from the auxiliary furnace. Carbonation of the smelt solution from the main recovery furnace need not be carried out under conditions which favor formation of the carbonate. This carbonation is only for the purpose of reducing the sulfidity and may be carried out at atmospheric pressure and at temperatures in the 100° to 150° F. range.

The flow sheet of FIG. 3 illustrates the process of this invention when used in conjunction with a sulfite pulping process wherein wood is pulped by digesting in a liquor containing potassium sulfite and/or potassium bisulfite admixed with potassium carbonate and/or potassium bicarbonate. The spent digestion liquor may be combined with black liquor from a kraft pulping operation or the spent digestion liquor from the sulfite pulping may be evaporated alone and burned in a kraft type recovery furnace. Procedures for utilizing this recovery operation for manufacture of potassium compounds are described hereinbefore. As shown in the flow sheet of FIG. 3, however, the preparation of new digestion liquor requires that a portion of the smelt solution, after carbonation, be treated with sulfur dioxide gas in order to produce potassium sulfite or potassium bisulfite. The source of sulfur dioxide can be from the burning of the hydrogen sulfide evolved during carbonation, supplemented, if necessary, by burning of sulfur or roasting of a sulfide. The portion of the smelt solution which is not required for the preparation of new digestion liquor is used to produce potassium carbonate as a chemical by-product.

EXAMPLE 3

When 729 tons of pulping wood are digested in a solution containing 70.9 tons of potassium-base sulfite digestion liquor calculated as potassium oxide, 3.2 tons of potassium compounds are lost, which loss is made up in part by 1.3 tons of potassium recovered from the wood itself. The extracted spent cooking liquor is concentrated to about 50% total solids. Then 57.3 tons of potassium sulfate are added to the spent liquor concentrate. Furnacing of the spent liquor concentrate with the added potassium sulfate and subsequent recycle of a portion of the smelt to the upper zone of the furnace yields 125.3 tons of smelt comprising, essentially, potassium sulfide and enhanced potassium carbonate, which smelt is dissolved in water. The smelt solution is subjected to plural stage carbonation, each of which stages is followed by flash-stripping, in accordance with the technique of this process for the purpose of substantially eliminating hydrogen sulfide and the enhancement of the carbonate content of this solution. The hydrogen sulfide evolved in the carbonating reaction is oxidized to sulfur dioxide and directed to the sulfiting tower. The carbonated solution is divided into two portions. 56.6% is pumped to the sulfiting tower for preparation into new digestion liquor. The other portions of carbonated solution, or 43.5%, is concentrated and the potassium carbonate content is removed by crystallization to yield 51.7 tons of pure potassium carbonate. 2.7 tons of potassium sulfate are precipitated from the solution and cycled to the recovery furnace as part of the makeup excess potassium sulfate.

In any application of this invention, where it is desirable to utilize potassium chloride as a raw material rather than potassium sulfate, the potassium chloride is reacted with sulfuric acid, thereby evolving hydrogen chloride and forming potassium sulfate or potassium bisulfate, either of which can be added to the recovery furnace. The hydrogen chloride may be used in many ways; for example, in the preparation of chlorine dioxide or chlorine gas.

It will be appreciated that potassium base digestion liquors utilized in conjunction with the kraft technique, the sulfite technique, the neutral sulfite process, the alkaline sulfite process and the potassium analog of the soda process may be combined for evaporation and burned in a common recovery furnace and further treated in accordance with the process of this invention, in that large quantities of potassium carbonate may be manufactured from the smelt of the combined spent digestion liquors and new digestion liquors used in each of the respective pulping techniques may be manufactured from the single smelt obtained.

Where it is desired to manufacture potassium bicarbonate in the process of our invention, it is necessary only to alter the carbonation conditions in such manner that potassium bicarbonate is formed, rather than potassium carbonate.

It is obvious that these and other modifications may be resorted to without departing from the spirit and scope of this invention. Accordingly, only those limitations should be embodied as set forth in the appended claims.

We claim:
1. In the pulping of ligneous cellulosic materials with potassium base cooking liquors, the process of preparing solutions of potassium salts of carbonic acid comprising the steps of, adding potassium sulfate to spent potassium base cooking liquor in an amount substantially in excess of that required to replenish losses resulting from the pulping and recovery operation, burning said spent liquor to produce a smelt comprising potassium carbonate and potassium sulfide, dissolving said smelt to product a smelt solution comprising potassium carbonate and potassium sulfide, and carbonating at least a portion of said smelt solution with a gas containing carbon dioxide to generate hydrogen sulfide gas and thereby produce a solution of potassium salts of carbonic acid.

2. The process according to claim 1 further including the steps of combining a portion of the solution of potassium salts of carbonic acid with a portion of the smelt solution to prepare kraft pulping liquor.

3. The process according to claim 1 further including the step of treating a portion of the solution of potassium salts of carbonic acid with $SO_2$ to form sulfite pulping liquor.

4. The process according to claim 1 further including the step of causticizing a portion of the solution of potassium salts of carbonic acid to produce a potassium hydroxide cooking liquor.

5. The process according to claim 1 further including the step of further treating the solution of potassium salts of carbonic acid to produce a potassium compound of the class consisting of: potassium carbonate, potassium bicarbonate, and potassium hydroxide.

6. The process according to claim 1 further including the step of burning a portion of said smelt in the presence of sufficient carbon dioxide to lower its content of sulfur-containing compounds.

7. In the pulping of ligneous cellulosic materials with potassium base cooking liquors, the process of preparing solutions of potassium carbonate comprising the steps of burning a portion of the spent cooking liquor from said pulping operations to produce a smelt comprising potassium carbonate and potassium sulfate, dissolving said smelt in water to produce a solution of potassium carbonate and separating the insoluble potassium sulfate therefrom, returning said separated potassium sulfate to one other portion of spent cooking liquor, introducing additional potassium sulfate to said other portion of spent cooking liquor in an amount substantially in excess of that required to replenish losses in the pulping and recovery operations, burning this portion of said liquor to produce a smelt comprising potassium carbonate and potassium sulfide, dissolving said smelt to produce a smelt solution comprising potassium carbonate and potassium sulfide, and carbonating said smelt solution with a gas containing carbon dioxide and thereby generating hydrogen sulfide gas in an amount sufficient to reduce the sulfidity of the solution to the level desired for the preparation of kraft cooking liquor.

8. In the pulping of ligneous cellulosic materials by using potassium base cooking liquors, the process of preparing solutions of potassium salts of carbonic acid comprising the steps of adding potassium sulfate to spent cooking liquor in an amount substantially in excess of that required to replenish losses in the pulping and recovery operation, said excess being up to and including the ratio of one mole of potassium sulfate to two moles of total potassium compounds present (expressed as $K_2O$), burning said liquor to produce a smelt comprising potassium carbonate and potassium sulfide, dissolving said smelt to produce a smelt solution comprising potassium carbonate and potassium sulfide, and carbonating at least a portion of said smelt solution with a gas containing carbon dioxide to generate hydrogen sulfide gas and thereby produce a solution of potassium salts of carbonic acid.

9. The process according to claim 8 further including the step of combining a portion of the solution of potassium salts of carbonic acid with a portion of the smelt solution and thereby prepare kraft pulping liquor.

10. The process according to claim 8 further including the step of treating a portion of the solution of potassium salts of carbonic acid with $SO_2$ and thereby converting the solution to sulfite pulping liquor.

11. The process according to claim 8 further including the step of causticising a portion of the solution of potassium salts of carbonic acid to produce a potassium hydroxide cooking liquor.

12. The process according to claim 8 further including the step of processing the solution of potassium salts of carbonic acid to produce a compound of the class consisting of; potassium carbonate, potassium bicarbonate, and potassium hydroxide.

13. The process according to claim 8 further including the step of burning a portion of said smelt in the presence of sufficient carbon dioxide to reduce its content of sulfur-containing compounds.

14. In the pulping of ligneous cellulosic materials with potassium base cooking liquors, the process of preparing solutions of potassium carbonate comprising the steps of burning a portion of the spent cooking liquor from said pulping operations to produce a smelt comprising potassium carbonate and potassium sulfate, dissolving said smelt in water to produce a solution of potassium carbonate, separating therefrom the insoluble potassium sulfate, returning said potassium sulfate together with additional potassium sulfate to the remaining portion of spent cooking liquor in an amount substantially in excess of that required to replenish losses in the pulping and recovery operations, said excess being up to and including the ratio of one mole of potassium sulfate to two moles of total potassium compounds (expressed as $K_2O$), burning said portion of said liquor to produce a smelt comprising potassium carbonate and potassium sulfide, dissolving said smelt to produce a smelt solution comprising potassium carbonate and potassium sulfide, and carbonating said smelt solution with a gas containing carbon dioxide to generate hydrogen sulfide gas to an extent sufficient to reduce the sulfidity of the solution to the level desired for the preparation of kraft cooking liquor.

15. In the pulping of ligneous cellulosic materials with potassium base cooking liquors wherein a continuous cycle of a potassium base liquor stream is employed in the sequence of digesting said cellulosic materials with fresh potassium base cooking liquor, removing spent potassium base liquor from said digesting operation, conditioning said spent liquor for furnacing, furnacing said conditioned spent liquor under reducing conditions to form a smelt of patassium compounds in a lower state of oxidation than those of the conditioned spent liquor, treating said smelt to increase the ratio of potassium salts of carbonic acid to potassium sulfides in said smelt, reconstituting a fresh cooking liquor from said treated smelt, and returning said fresh cooking liquor to the digesting step; the process of preparing potassium salts of carbonic acid comprising; adding potassium sulfate in an amount substantially in excess of that required to replenish cycling losses of potassium compounds from said stream, to said potassium base cooking liquor stream prior to said furnacing step; separating a portion of liquor from said stream after said conditioning step but prior to said reconstituting step; reacting said portion after said conditioning step to convert potassium sulfides contained thereby into potassium salts; thereafter recovering potassium salts of carbonic acid from said separated portion in an amount substantially corresponding in potassium content to that of the potassium sulfate added in excess of that required to replenish cycling losses; and thereafter returning any potassium sulfate salts remaining in said separated portion to said furnacing step and any potassium salts of carbonic acid remaining in said separated portion to said reconstituting step.

16. The process claimed in claim 15 wherein the amount of potassium sulfate added in excess of that required to replenish cycling losses corresponds in potassium content to up to one-half the weight of potassium content in the spent liquor from said digesting operation.

References Cited in the file of this patent

UNITED STATES PATENTS

| | | |
|---|---|---|
| 1,728,252 | Rawling | Sept. 17, 1929 |
| 2,054,727 | Lundin | Sept. 15, 1936 |